United States Patent
Yamagata

[11] Patent Number: 6,018,593
[45] Date of Patent: Jan. 25, 2000

[54] METHOD AND SYSTEM FOR CORRECTING IMAGE POSITION BASED UPON PREDETERMINED PATTERN PORTIONS

[75] Inventor: Hideaki Yamagata, Yokohama, Japan

[73] Assignee: Ricoh Company, Ltd., Japan

[21] Appl. No.: 08/927,882

[22] Filed: Sep. 11, 1997

[30] Foreign Application Priority Data

| Sep. 11, 1996 | [JP] | Japan | 8-240154 |
| Oct. 16, 1996 | [JP] | Japan | 8-273837 |

[51] Int. Cl.⁷ .................................................. G06K 9/46
[52] U.S. Cl. ........................... 382/201; 382/202; 382/286
[58] Field of Search ................................... 382/151, 201, 382/202, 203, 205, 206, 282, 283, 286, 287, 288, 291

[56] References Cited

U.S. PATENT DOCUMENTS

| 4,777,651 | 10/1988 | McCann et al. | 382/242 |
| 4,849,679 | 7/1989 | Taft et al. | 382/151 |
| 4,910,787 | 3/1990 | Umeda et al. | 382/202 |
| 5,065,438 | 11/1991 | Hirose et al. | 382/202 |
| 5,075,895 | 12/1991 | Bessho | 382/202 |
| 5,233,670 | 8/1993 | Dufour et al. | 382/205 |
| 5,561,721 | 10/1996 | Mutz | 382/205 |
| 5,572,603 | 11/1996 | Koike | 382/205 |
| 5,621,811 | 4/1997 | Roder et al. | 382/147 |
| 5,703,963 | 12/1997 | Kojima et al. | 382/205 |
| 5,774,584 | 6/1998 | Matsumoto et al. | 382/202 |

FOREIGN PATENT DOCUMENTS

| 53-48059 | 12/1978 | Japan . |
| 59-218573 | 12/1984 | Japan . |
| 63-3388 | 1/1988 | Japan . |
| 63-212269 | 9/1988 | Japan . |
| 2-54495 | 11/1990 | Japan . |
| 4-261259 | 9/1992 | Japan . |
| 4-336677 | 11/1992 | Japan . |
| 7-101438 | 11/1995 | Japan . |

Primary Examiner—Matthew C. Bella
Attorney, Agent, or Firm—Knoble & Yoshida LLC

[57] ABSTRACT

An optical character recognition method and system adjusts positional, rotational and scaling differences between an input form image and a standard form image based upon selected corresponding portions of the two images prior to optically recognizing characters in predetermined areas of the input form. The corresponding portions include a predetermined mark such as a cross-line portions and or predetermined characters, and a selection process of these corresponding portions eliminates unlikely pairs of the corresponding portions based upon a distribution histogram analysis.

15 Claims, 18 Drawing Sheets

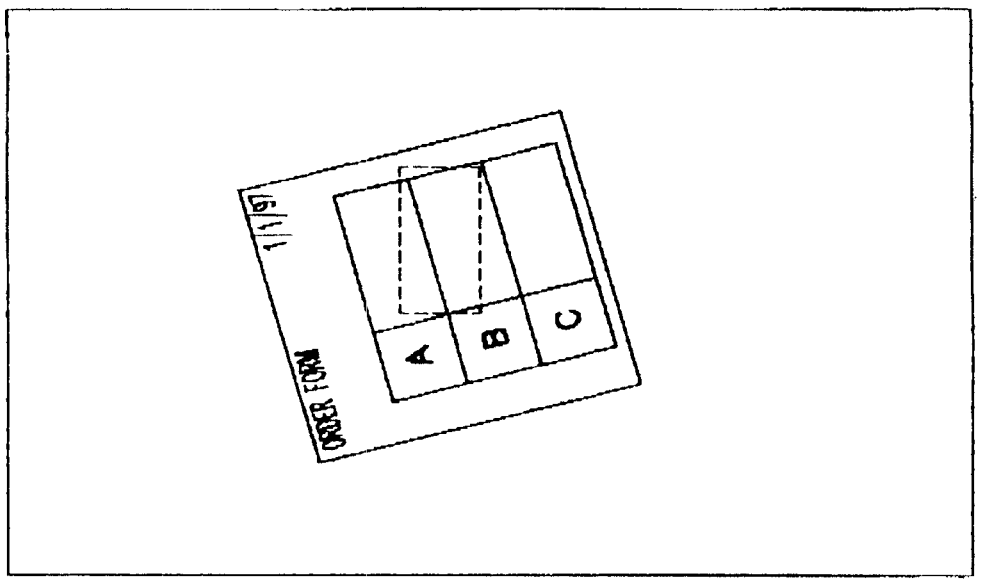
FIG. 1B
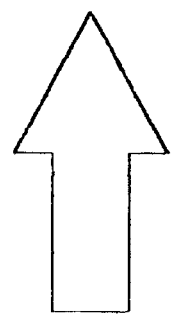
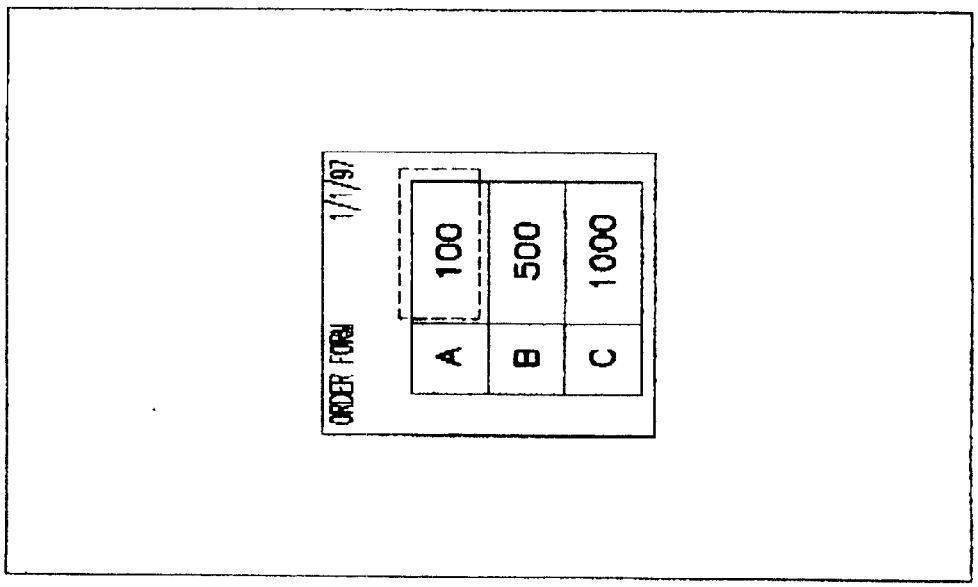
FIG. 1A

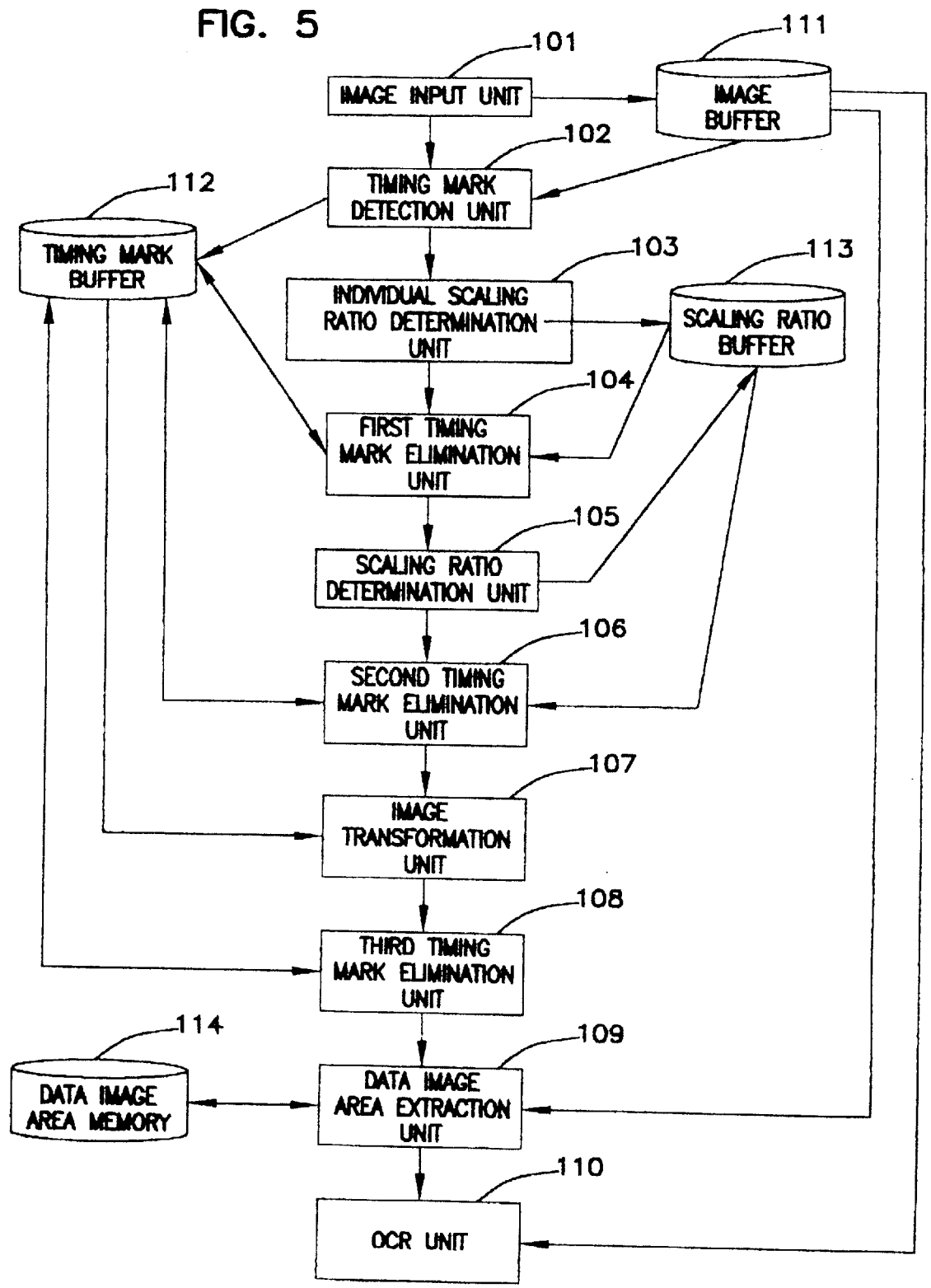

FIG. 7

EXEMPLARY STAND IMAGE PATTERN MEMORY CONTENT

| CROSS PORTION # | WIDTH OF VERTICAL LINE | WIDTH OF HORIZONTAL LINE | COORDINATES |
|---|---|---|---|
| 301 | 4 | 4 | (1120,695) |
| 302 | 4 | 4 | (1120,910) |
| 303 | 4 | 4 | (1120,1125) |
| 304 | 4 | 4 | (1120,1225) |
| 305 | 4 | 4 | (1755,695) |
| 306 | 4 | 4 | (1755,910) |
| 307 | 4 | 4 | (1755,1125) |
| 308 | 4 | 4 | (1755,1225) |

BEFORE MASKING

AFTER MASKING

AFTER EXTRACTING

CROSS-LINE PORTION RECTANGLE

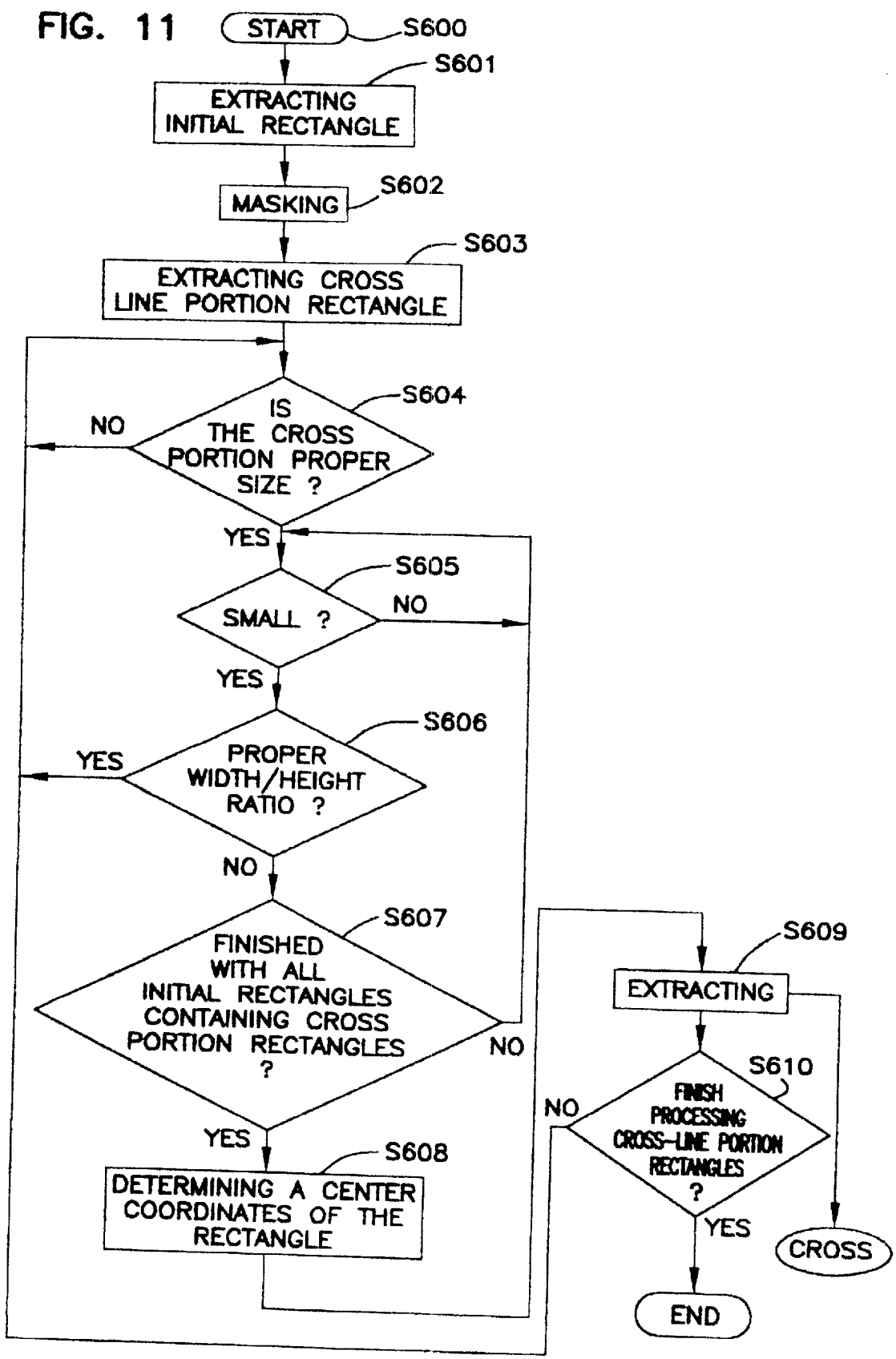

1st HISTOGRAM PAIR

2nd HISTOGRAM PAIR

EXEMPLARY DATA IMAGE AREA MEMORY

| DATA IMAGE AREA # | LABEL | COORDINATES |
|---|---|---|
| A1 | 1 | (1125,485)–(2100,895) |
| A2 | 2 | (1125,700)–(2100,910) |
| A3 | 3 | (1125,915)–(2100,1125) |

FIG. 16

METHOD AND SYSTEM FOR CORRECTING IMAGE POSITION BASED UPON PREDETERMINED PATTERN PORTIONS

FIELD OF THE INVENTION

The current invention is generally related to an optical character recognition method and system, and more particularly related to a method and a system for optically recognizing characters in predetermined forms after positional adjustments based upon a predetermined mark and or predetermined characters.

BACKGROUND OF THE INVENTION

In electrically transmitting image data from an image-carrying medium, it is difficult to place the image-carrying medium such as a sheet of paper at a predetermined orientation with respect to a scanner of a data transmitting device. As a result of inaccurate placement of the image data, at a receiving end of the electronic transmission, the image data is rotated or misplaced. This misplacement of the image data is not only aesthetically unpleasant, but also causes a data entry problem if the transmitted image is used to generate a data entry signal for a computer system. For example, referring to FIG. 1A, a customer uses a predetermined standard data entry order form to order 100 units of a products A, 500 units of a product B and 1000 units of a product C. The customer faxes the above described order form, and as indicated by a dotted line a certain quantity such as 100 units is located at a predetermined position in the order form. However, according to this example, the order form is accidentally placed upon transmission. As a result, the received order form on an image carrying medium or the received order form image is at an angle as shown in FIG. 1B. Although an area as indicated in the dotted line is scanned for determining a quantity of the product A, an image of the numerical figures for the intended quantity is not located in the expected area due to the misplacement. To correct the above described problem, prior art attempts included the following approaches.

According to a first approach, Japanese Laid Publication 63-3388 discloses a positional correction method using template matching which gradually changes the position of a template with respect to an input image in the X and Y directions. At each position, a matching score is generated to reflect how close the input image portion matches the template. Based upon the matching scores at the various positions, a vector is determined for correcting the position of the input image.

According to a second approach, Japanese Patent 2-54495 discloses a positional correction method based upon bit or on-pixel counts in the X and Y directions. The number of on-bits in each row and column of an input image as well as a standard image respectively is counted. Based upon the comparison of these bit counts between the input image and the standard image, an amount of positional adjustments is determined. The above determined positional amount is to minimize the discrepancy in the bit count between the input image and the standard image.

According to a third approach Japanese Laid Publication 4-261259 discloses a rotational correction method. While one way of determining an amount of rotational discrepancy is a user input via a pointing device, another way is to automatically determine the discrepancy using a predetermined set of marks or location indicators in an input image and a standard image. Japanese Laid Publications 53-48059 and 7-101438 also disclose the use of a predetermined set of marks such as timing marks at specified locations on a sheet of paper for scanning information in the forms.

According to a fourth approach, Japanese Laid Publication 4-336677 and 4-261259 discloses a correction method based upon corresponding points which are determined by an user input via a pointing device or are automatically determined in an input image and a standard image. Subsequently, input image areas are determine to include these corresponding points in the input image. To determine an amount of correction for placing the input image at a desirable position, the input image areas are moved with respect to those in the standard image for a best match.

For the above described approaches which employ corresponding pairs of predetermined marks, Japanese Patent 59-218573 discloses a method of removing certain corresponding pairs of markers before determining an amount of positional adjustments in order to improve the accuracy of such adjustments.

The above described prior attempts are either computation intensive or require an additional predetermined marker on a data entry form. In the first and fourth approaches, an input image is variously positioned at a predetermined interval with respect to a standard image, and at each position, a computation-intensive pattern matching process is performed. Although the positional interval is adjusted to control the number of repetition, the larger the interval is, the less accurate the pattern matching process becomes.

As to the second approach, the accuracy of pattern matching is affected by rotation, enlargement or reduction of an input image. Japanese Patent 63-212269 discloses one way to take the above described scaling issue into consideration by determining a scale factor based upon a corresponding pair of predetermined marks.

Lastly, as to the third approach, an additional location marker is necessary for automatically determining an amount of correction. Such additional markers are generally undesirable since they occupy areas in the data entry form. In order to rely upon these location markers to determine an accurate amount of positional correction, a relatively large number of these markers is necessary. Even though a large number of marks is used, if these marks are relatively inconspicuous for improving the above described appearance concern, erroneous detections of these marks become a problem for determining an amount of positional correction.

For these above described and other reasons, the prior art attempts do not provide a satisfactory method or system for correcting the positional location of an input image which has been inputted via an image inputting device such as a scanner.

SUMMARY OF THE INVENTION

In order to solve the above and other problems, according to one aspect of the current invention, a method of identifying a crossed portion of lines in an image input which are represented by pixels, including the steps of: a) moving a mask consisting of at least five positionally fixed pixels against the image input, at lest one of the five pixels located substantially at a center of other four of the five pixels, the one pixel being defined as a center pixel while the four pixels being defined as peripheral pixels; b) modifying a pixel in the image input corresponding to the center pixel when any one pixel in the image input corresponding to the peripheral pixels has a pixel value other than a predetermined value; and c) repeating the steps a) and b) until the crossed portion of the lines is surrounded by off pixels.

According to a second aspect of the current invention, A method of identifying corresponding positions for matching a pair of variably positioned and or variably scaled input form and a standard form, including the steps of: a) identifying a first predetermined number of pairs of substantially corresponding portions between the forms; b) generating a first distribution histogram for occurrences of a certain range of scale factors along a predetermined axis based upon a second predetermined number of the corresponding portions, the second predetermined number being smaller than the first predetermined number; c) generating a second distribution histogram for occurrences of the pairs based upon a selected portion of the first distribution histogram, the selected portion being indicative of substantially aberrant distribution; and d) eliminating certain one of the pairs above a first predetermined threshold in the second distribution histogram and leaving remaining pairs of the substantially corresponding portions.

According to a third aspect of the current invention, a system for identifying a crossed portion of lines in an image input which are represented by pixels, including: a input buffer for holding the image input; a mask consisting of at least five positionally fixed pixels against the image input, at lest one of the five pixels Located substantially at a center of other four of the five pixels, the one pixel being defined as a center pixel while the four pixels being defined as peripheral pixels; a cross line processor connected to the input buffer for modifying a pixel in the image input corresponding to the center pixel when any one pixel in the image input corresponding to the peripheral pixels has a pixel value other than a predetermined value until the crossed portion of the lines is surrounded by off pixels.

According to a fourth aspect of the current invention, a system for identifying corresponding positions so as to match a pair of variably positioned and or variably scaled input form and a standard form, including: a corresponding pair identifying unit for identifying a first predetermined number of pairs of substantially corresponding portions between the forms; a first histogram generation unit connected to the corresponding pair identifying unit for generating a first distribution histogram for occurrences of certain scale ratios along a predetermined axis based upon a second predetermined number of the corresponding portions, the second predetermined number being smaller than the first predetermined number; a second histogram generation unit connected to the first histogram generation unit for generating a second distribution histogram for occurrences of the pairs based upon a selected portion of the first distribution histogram, the selected portion being indicative of substantially smaller distribution; and a corresponding pair eliminating unit for eliminating certain one of the pairs below a first predetermined threshold in the second distribution histogram.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIGS. 1A and 1B illustrates a problem in extracting data image from an input form which is not aligned with predetermined coordinates.

FIG. 5 is a block diagram illustrating a second preferred embodiment for selecting and eliminating corresponding portions between an input form image and a standard form image prior to correcting misalignment of an input form image so as to extract data image areas according to the current invention.

FIG. 7 is a set of exemplary pattern information used in a preferred process of selecting and eliminating corresponding portions between the input form image and the standard form image according to the current invention.

FIG. 11 is a flow chart illustrating steps involved in one preferred process of identifying corresponding cross-line portions and eliminating certain of the identified cross-line portions according to the current invention.

FIG. 16 illustrates exemplary data for identifying image areas.

DETAILED DESCRIPTION OF THE PREFERRED EMBODIMENT(S)

Figure 2:
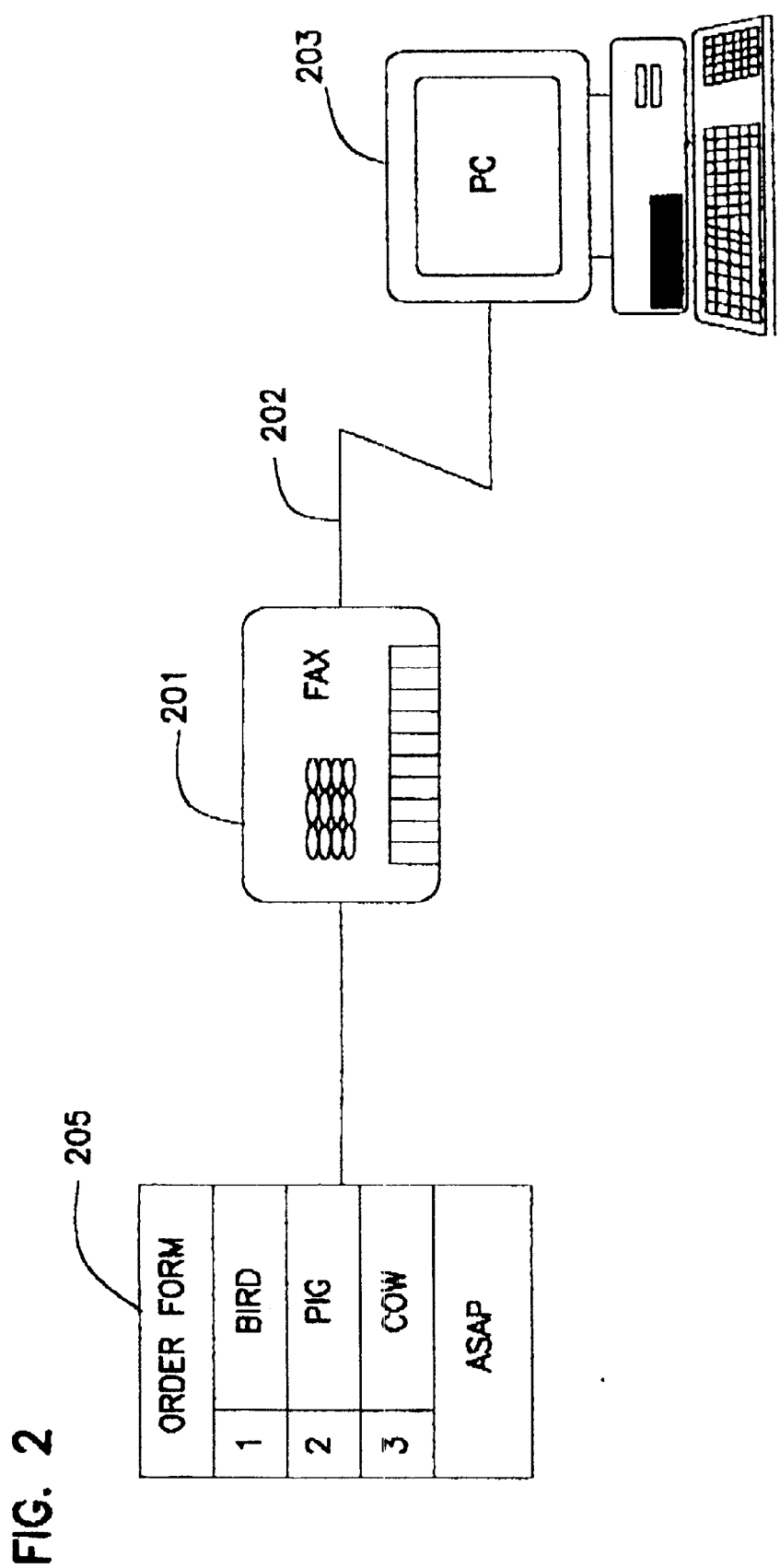
FIG. 2 diagrammatically illustrates an overall system for correcting misalignment of an input form image prior to extracting data image portions according to the current invention.

Referring now to the drawings, wherein like reference numerals designate corresponding structure throughout the views, and referring in particular to FIG. 2, a first preferred embodiment of the image position correction system according to the current invention is conceptually illustrated. One predetermined form 205 is transmitted to a personal computer (PC) 203 via a facsimile machine 201 for automatically entering information contained in the form 205 into a data storage unit in the computer 203. For example, one application of the above described data entry is an order entry system for taking an order and shipping a product. The graphical image of the information or data on the form 205 is converted into a data form such as an alphanumeric character data form so that the information is more efficiently stored in the PC 203. However, as described in the Background section, the graphical image data needs to be often positionally corrected.

Figure 3:
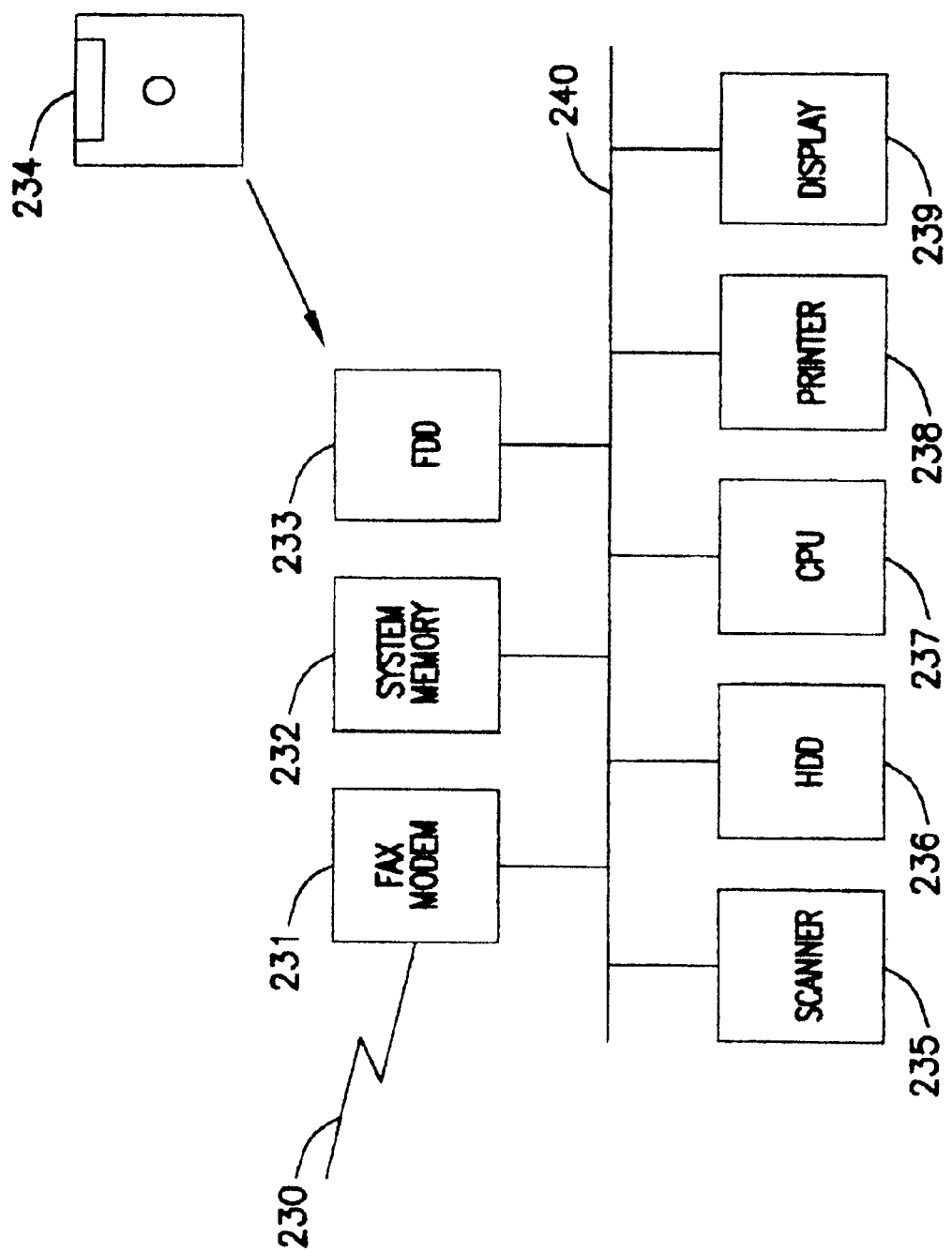
FIG. 3 is a block diagram illustrating major components used in a system for selecting and eliminating corresponding portions between an input form image and a standard form image prior to correcting misalignment of an input form image so as to extract data image areas according to the current invention.

Referring to FIG. 3, a second preferred embodiment of the image position correction system according to the current invention is diagrammatically illustrated. In addition to a fax transmission line and a fax modem 231 for entering input image data on an input form into the system, the input image data is stored in a floppy disk 234 and or a hard disk and is respectively retrieved by a floppy disk drive 233 and a hard disk drive 236 so as to load the data in a system memory. Furthermore, the input image data is also optionally inputted via a scanner 235. A central processing unit 237 runs software on the system memory unit 232 for processing the input image data, and the optically recognized data may be printed by a printer 238 or may be displayed by a display unit 239.

Figure 4:
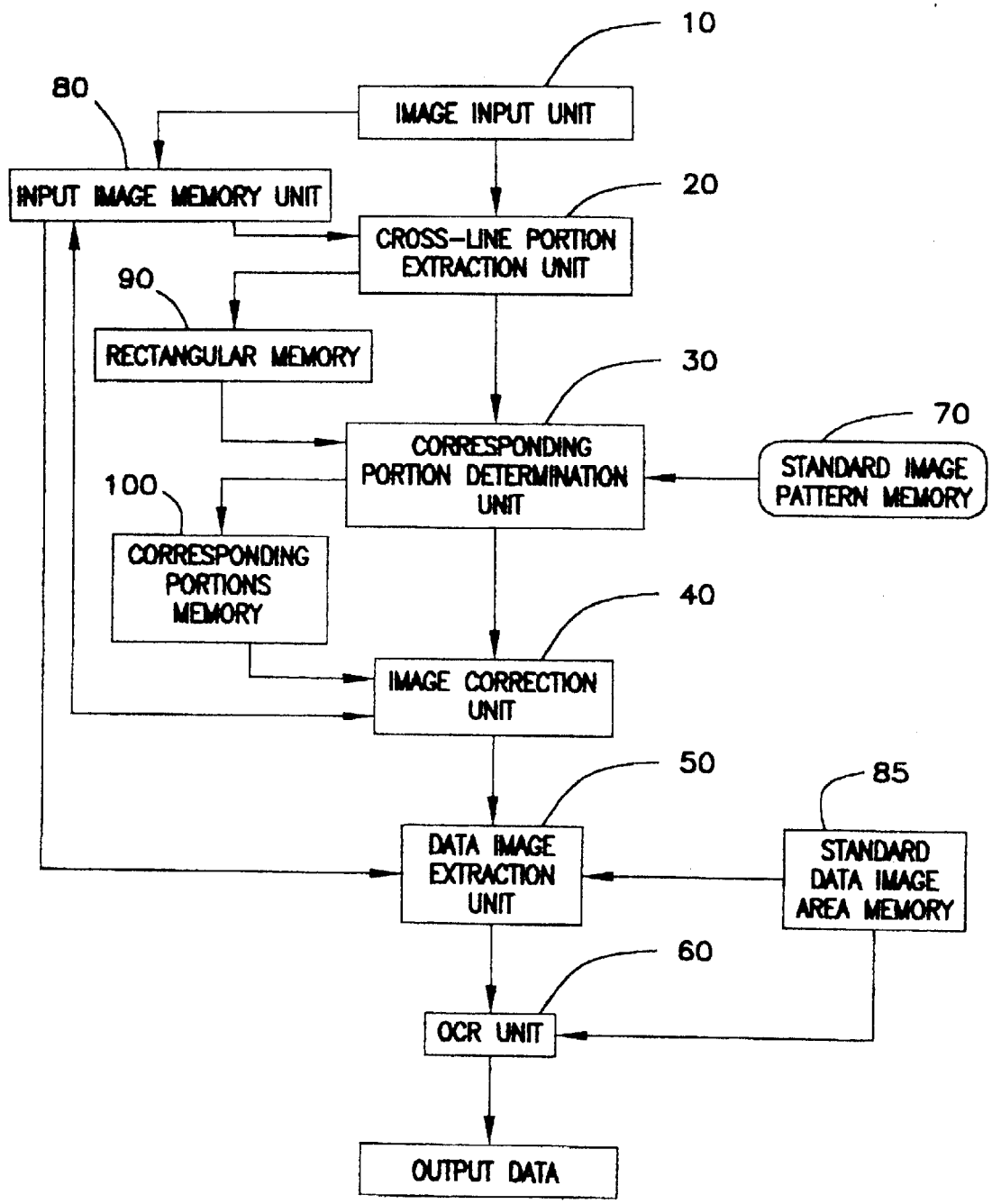
FIG. 4 is a block diagram illustrating a first referred embodiment for selecting and eliminating corresponding portions between an input form image and a standard form image prior to correcting misalignment of an input form image so as to extract data image areas according to the current invention.

Referring to FIG. 4, a third preferred embodiment of the image position correction system according to the current invention is diagrammatically illustrated. An image input unit 10 inputs input image data on an input form into an input image memory unit 80. In order to determine corresponding portions between the input form and a standard form, a cross-line portion extraction unit 20 extracts cross-line portions based upon a predetermined mask applied against the input image data. The cross-line portions are generally defined as areas or a set of coordinates in an image where two lines cross in a substantially perpendicular manner, and the two lines may be a part of a form, an independent position mark, or a part of a alphanumeric character. The extracted cross-line portions are stored in a rectangular memory unit 90. A corresponding portion determination unit 30 determines the geometric relations of the extracted cross-line portions with respect to the corresponding portions in standard image data stored in a standard image memory unit 70. The geometric relations include positions, angles and scaling factors. Based upon the geometric relations stored in a corresponding portions memory, an image correction unit corrects either the input image or the standard image so that the input image and the standard image substantially match. A data image extraction unit 50 extracts data image portions from the corrected input image based upon data area information stored in a standard data image area memory unit 85. Finally, an optical character recognition (OCR) unit 60 converts data image representing input data into an alphanumeric form.

To determine corresponding portions between an input form image and a standard form image for ultimately extracting and recognizing information in the input image, referring to FIG. 5, a second preferred embodiment of the system for eliminating undesirable corresponding portions according to the current invention is illustrated. The second preferred embodiment includes an image input unit 101 for inputting input image data to an image buffer unit 111. A timing mark detection unit 102 detects a plurality of predetermined marks such as the above described cross-line portions or predetermined characters in the input image. The timing marks are substantially interchangeable with common corresponding portions that exist in the input form image and the standard form image. The information on the detected marks is stored in a timing buffer unit 112.

Still referring to FIG. 5, after the timing marks are identified, the preferred embodiment of the system according to the current invention selectively eliminates undesirable corresponding portions before transformation. An individual scaling ratio determination unit 103 determines a scaling factor or ratio between the input form image and the standard form image based upon the corresponding portions and sores the result in a scaling ratio buffer 113. A first timing mark elimination unit 104 eliminates certain one or ones of pairs of the corresponding portions between the input form image and the standard form image. The elimination is based upon a set of histograms generated for indicating the distribution of scaling factors or ratios. After the elimination of the certain pairs, a scaling ratio determination unit 105 uses remaining pairs of the substantially corresponding portions to further determine more accurate geometric relation between the input form image and the standard form image and stores the result in the scaling ratio buffer 113. Based upon the stored scaling information, a second timing mark elimination unit 106 further eliminates certain pairs of the remaining corresponding portions or timing marks to determine the geometric information.

Still referring to FIG. 5, the preferred embodiment of the system finally performs transformation base upon the selected data and further processes before optical character recognition. An image transformation unit 107 transforms either the input form image or the standard form image to match these images. One exemplary transformation includes an affine transformation which corrects a position, scaling (reduction or enlargement) and a rotated angle between the input form image and the standard form image. After the transformation, a third timing mark elimination unit 108 finalizes or eliminates certain of the remaining marks before a data image area extraction unit 109 extracts data image from the input form image based upon the information on the standard image data areas stored in a data image area memory unit 114. Lastly, an optical character recognition unit 110 optically recognizes the extracted image information and converts into non-graphical data.

Figure 6A:
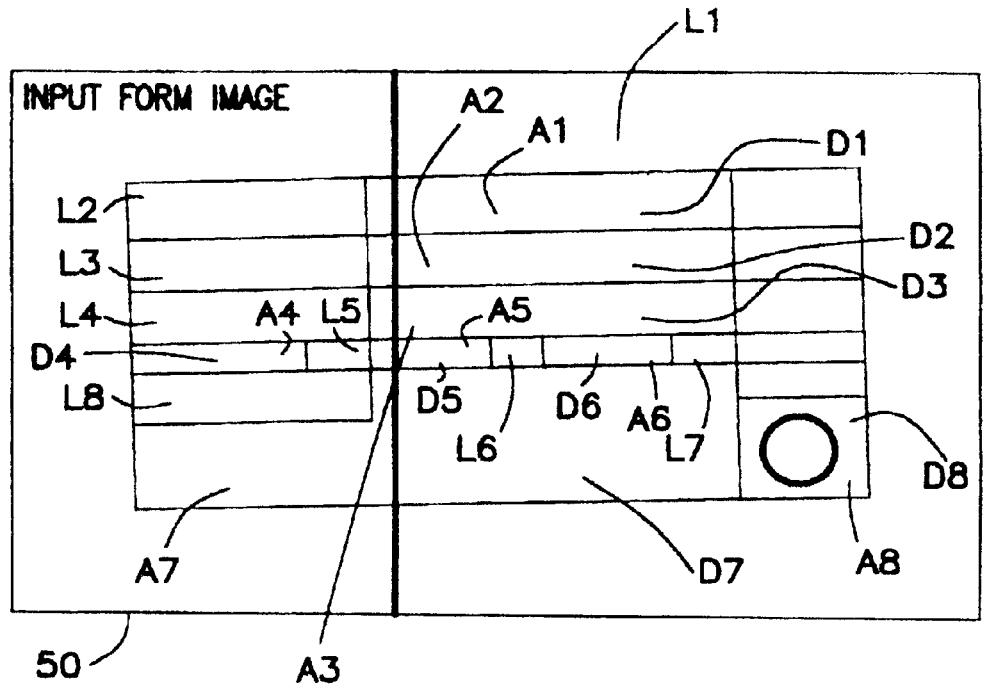
FIG. 6 is a set of exemplary input and standard form images to illustrate elements used in a preferred process of selecting and eliminating corresponding portions between the input form image and the standard form image according to the current invention.
Figure 6B:
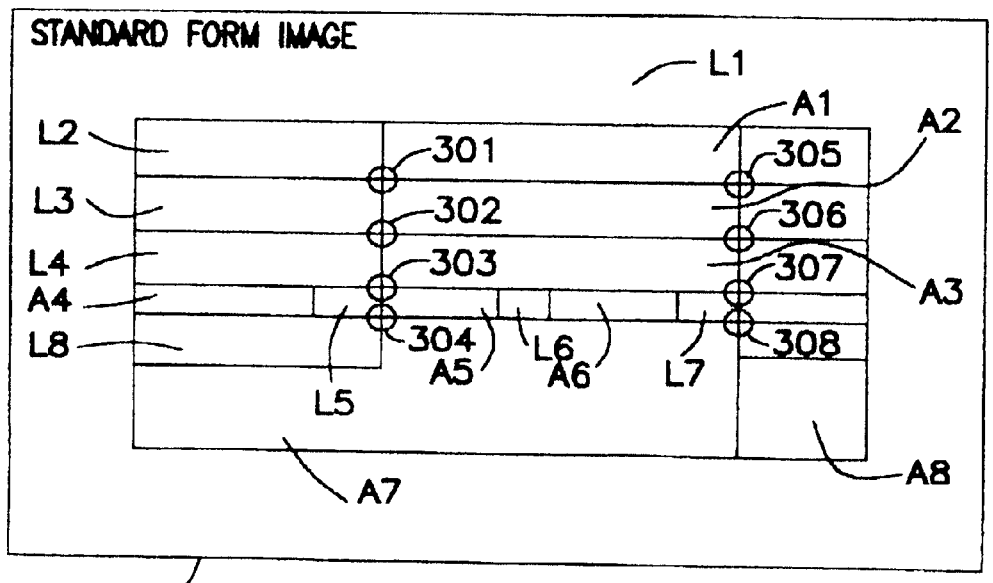

To further illustrate the operations of some of the components of the above described preferred embodiments of the system according to the current invention, detailed examples will be provided. Referring to FIG. 6, an input form image 50 is an order form in the Japanese language and contains labels and data areas which are identical to those of a predetermined standard order form 51. The input form image 50 additionally contains data image which represents data to be entered into a computer system via optical character recognition. The input and standard forms 50 and 51 each have a header label L1 "Order Form," an item label L2 "Product Name," an item label L3 "Product Number," an item label L4 "Quantity," an item label L5, "Year," an item label L6 "Month," an item label L7 "Date," and an item label L8 "Comments" at the identical relative locations. The input and standard forms 50 and 51 also each have the identical relative data areas including an a product name data area A1, a product number data area A2, a quantity data area A3, a year data area A4, a month data area A5, a date area A6, a comment data area A7 and a seal data area A8. In the respective data areas, the input form image additionally includes data or information such a product name D1 "Reading Story" in the data area A1, a product number D2 "R-1" in the data area A2, a quantity D3 "100" in the data area A3, a year D4 "1996" in the data area A4, a month D5 "7" in the data area A5, a date D6 "7" in the data area A6, a comment "Deliver as soon as possible" in the data area D7 and a seal D8 "Tanaka" in the data area A8.

Still referring to FIG. 6, in determining pairs of corresponding portions between the input form image 50 and the standard form image 51, although it is not limited to the use of cross-line portions and includes other markers, in this example, cross-line portions 301 through 308 are each used as a corresponding portion or a marker. The input form image in this example is slightly rotated in a counter clockwise direction and is also reduced in size in relation to the standard form image 51. In order to identify pairs of the corresponding portions between the input and standard images 50 and 51, candidates for the corresponding portions 301 through 308 are searched in the input form image 50. Information on the cross-line portions of the standard form image 51 has been previously stored at a predetermined storage unit such as a search file or a standard image pattern memory 70 of the first preferred embodiment.

Referring to FIG. 7, one example of the above described cross-line portion information includes cross-line portion reference numbers, the width of a substantially vertical line in a number of pixels, the width of a substantially horizontal line in a number of pixels, the coordinates of each cross-line portion. When the above coordinate information is absolute in the number of pixels and the input form image is not reduced or enlarged in size, matching of pairs of the corresponding cross-line portions involves comparison of the coordinates as expressed in the following equations:

$$|Xip-Ximp| < Lux \quad (1)$$

$$|Yip-Yimp| < Luy \quad (2)$$

$$|Xib-Ximb| < Lbx \quad (3)$$

$$|Yib-Yimb| < Lby \quad (4)$$

where Xip and Yip are respectively X and Y coordinates of the cross-line portions in the input form image while Ximp and Yimp are respectively X and Y coordinates of the cross-line portions in the standard form image. Similarly, Xib and Yib are respectively the width of a horizontal line and a vertical line in the cross-line portions in the input form image while Ximb and Yimb are respectively the width of a horizontal line and a vertical line of the cross-line portions in the standard form image. Lastly, Lux and Luy are respectively a predetermined allowable range in X and Y positions in an input form image while Lbx and Lby are respectively a predetermined allowable range in the width of a vertical line and a horizontal line in a standard form image. If the above equations (1) through (4) are all satisfied for a pair of candidates for the corresponding cross-line portions, the pair is established as corresponding cross-line portions.

Figure 8:
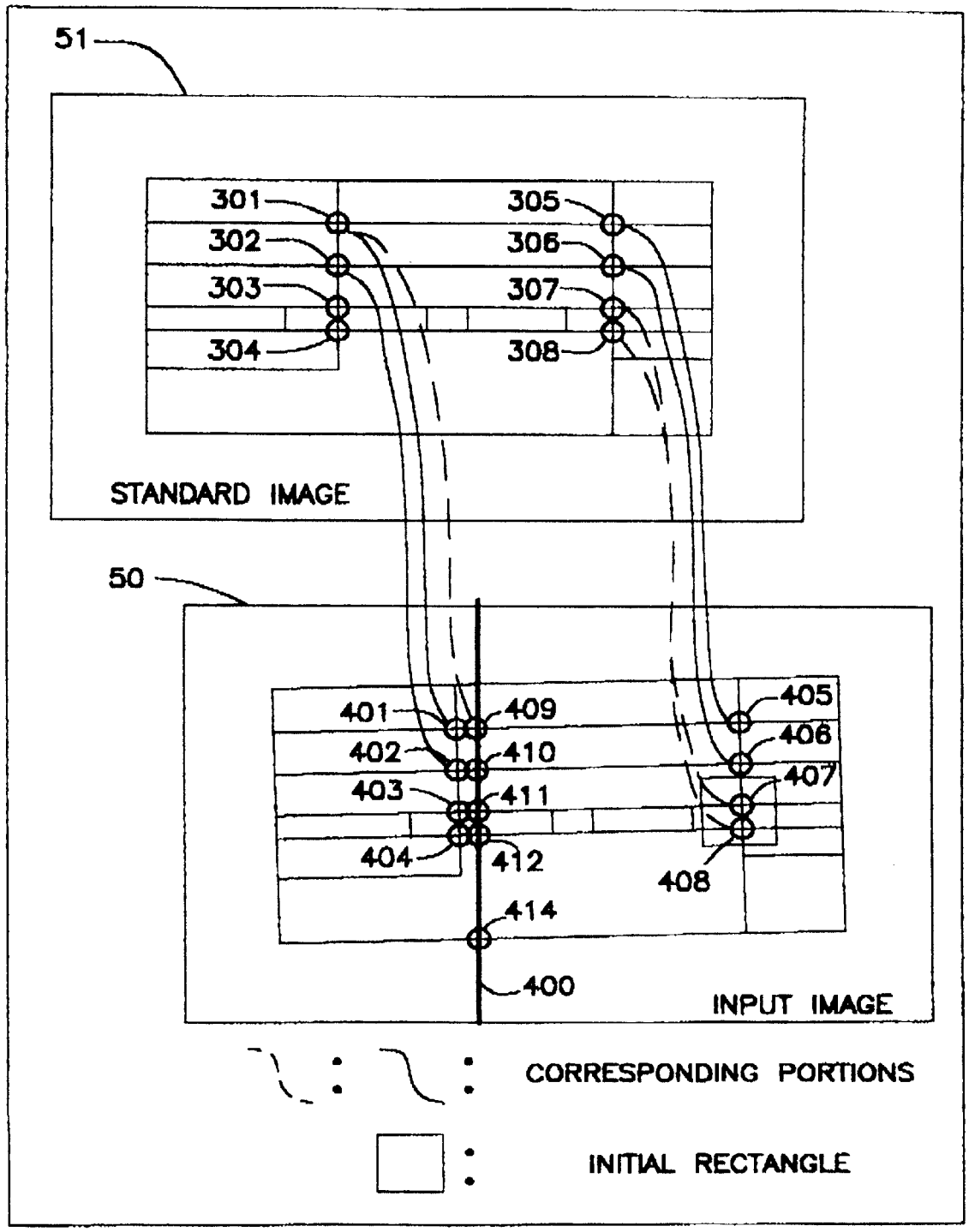
FIG. 8 is a set of exemplary in put and standard form images to illustrate corresponding elements used in a preferred process of selecting and eliminating corresponding portions between the input form image and the standard form image according to the current invention.

Now referring to FIG. 8, the use of the above described equations (1) through (4) for matching a candidate cross-line portion in an input image with a standard form cross-line portion is graphically illustrated. In this example, the input form image 50 and the standard form image 51 are identical in size, but the input form image has an undesirable noise as expressed as an additional line 400. For a standard form cross-line portion 301, candidates cross-line portions 401 and 409 are found due to the allowable positional ranges Lux and Luy. However, since the candidate 409 has a vertical line 400 which is assumed to be beyond a predetermined Lby, the candidate 409 is eliminated, and the candidate 401 is established as a pair of corresponding cross-line portions. Based upon the above described similar elimination steps, an input cross-line portion 402 is matched with a standard cross-line portion 302. Despite the above described elimination step base upon the line width, due to the allowable positional range, standard cross-line positions 303 and 304 are not conclusively matched with any of input corresponding cross-line portions and thereby are eliminated. Standard cross-line portions 305 and 306 are respectively matched with input cross-line portions 405 and 406 without an elimination step. On the other hand, standard cross-line portions 307 and 308 each have two candidates 407 and 408 within an allowable positional range for matching, and they are also eliminated from further processing.

The above example did not take scaling (i.e., enlargement or reduction) of an input form image with respect to a standard form image. When the input form image is not only variably positioned and or rotated but also enlarged or reduced with respect to the standard form image as shown in FIG. 6, a search for pairs of the corresponding cross-line portions generally requires some additional processing. To detect a location or a coordinate of a predetermined common mark such as a cross-line portion in an input form image, the input form image is masked.

Figure 9:
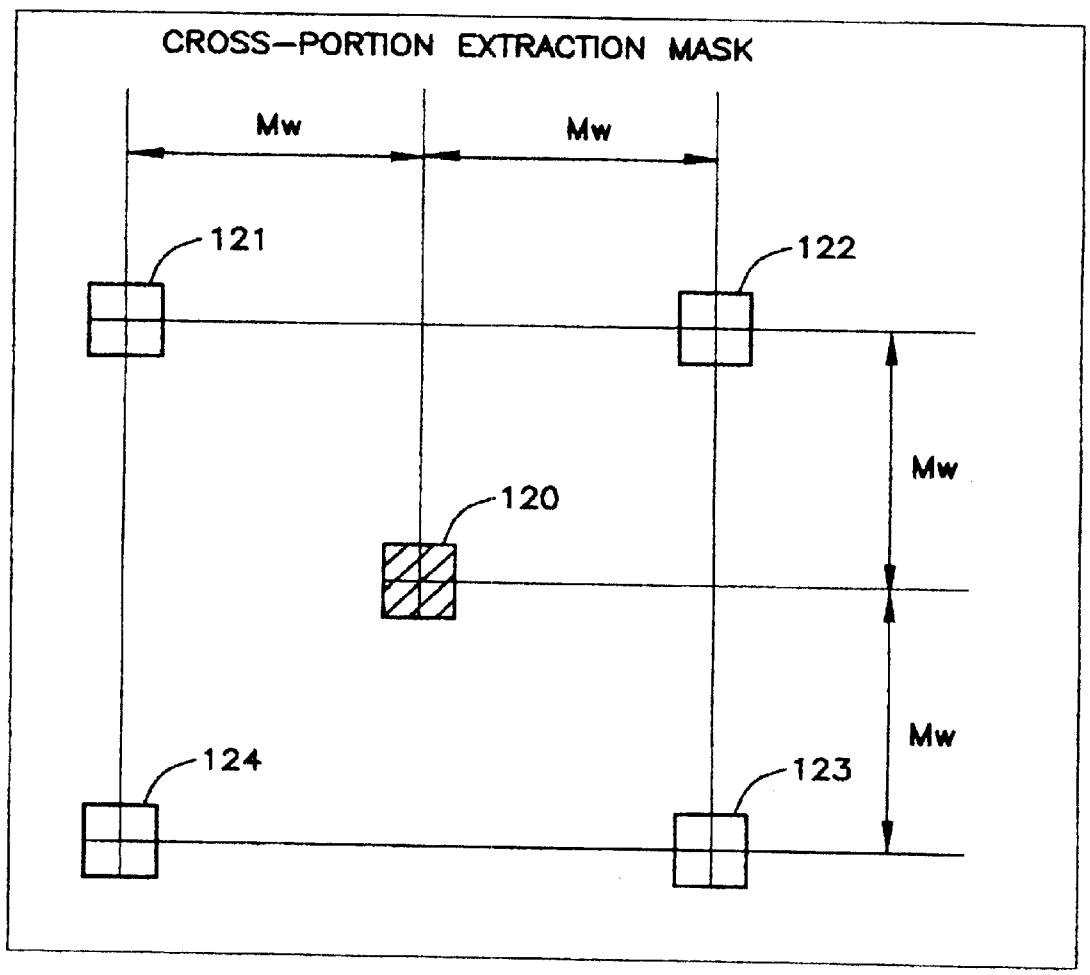
FIG. 9 illustrates one preferred embodiment of the mask used in a preferred process of identifying corresponding cross-line portions between the input form image and the standard form image according to the current invention.

Referring to FIG. 9, one preferred embodiment of the mask according to the current invention is illustrated. The preferred mask has at least five pixels, and one center pixel 120 is located at a substantially center of other four peripheral or corner pixels 121 through 124. The peripheral pixels 121 through 124 forms a square having a length 2 Mw for each edge. When all four pixels in an input image corresponding to the peripheral or corner pixels 121 through 124 are off, zero or white, a pixel in the input image corresponding to the center pixel 120 is turned on, to one or black.

Figure 10A:
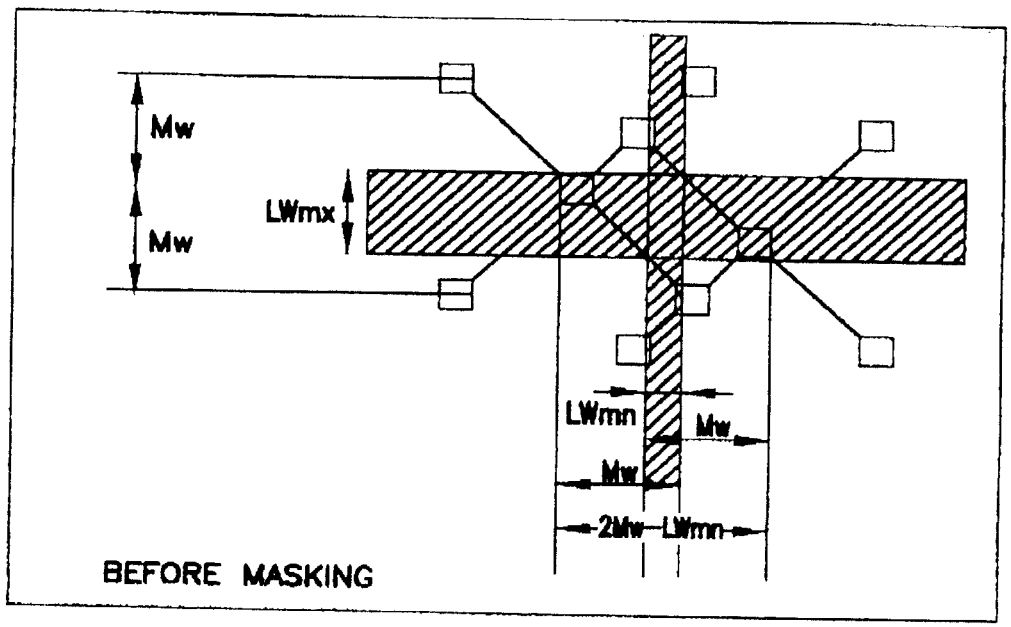
FIGS. 10A, 10B and 10C illustrate how one preferred embodiment of the mask identifies and isolates a cross-line portion in a preferred process according to the current invention.
Figure 10B:
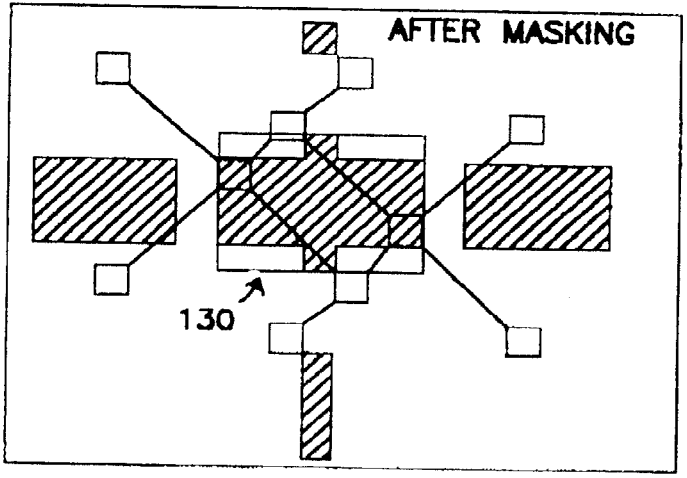
Figure 10C:
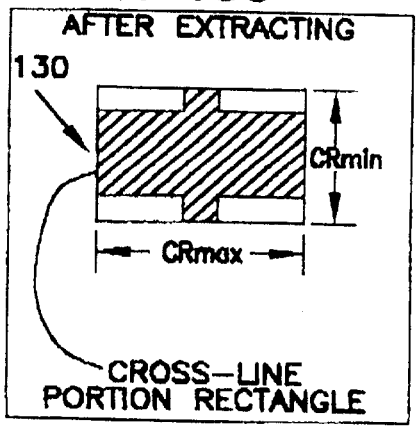

Referring to FIGS. 10A, 10B and 10C, an exemplary masking process and an associated extracting process are diagrammatically illustrated. Specifically referring to FIG. 10A, the above described preferred embodiment of the mask is applied to cross lines to identify a cross-line portion. The mask having 2 Mw for each edge defined by any two peripheral pixels is scanned against the cross line area, and at each pixel position, it is determined whether all of four input image pixels which correspond to the four peripheral mask pixels are white or off. At each pixel location during scanning, when all of the four input pixels are off, an input pixel corresponding to the center mask pixel is turned on or black. The above described masking process is repeated until a predetermined input image area or an entire input image area is masked.

As a result of the above masking, referring to FIG. 10B, an area surrounding an intersection of the cross lines is isolated by white or off pixels. This isolated area is demarked by a minimal surrounding rectangular or a cross-line portion rectangle 130. The size of the cross-line portion rectangle 130 depends upon the mask as well as the width of the cross-lines. The length of each edge of the cross-line portion rectangle 130 ranges from a minimal edge size CRmin to a maximal edge size CRmax, which are both a number of pixels and defined as follows:

$$CRmin = 2 \; Mw - LWmax \quad (5)$$

$$CRmax = 2 \; Mw - LWmin \quad (6)$$

wherein LWmax is a number of pixels indicating the maximal width of the cross lines while LWmin is a number of pixels indicating the minimal width of the cross lines. In the current example, LWmax is the width of the horizontal line while LWmin is the width of the vertical line.

Now referring to FIG. 10C, the isolated cross-line portion is demarcated by the cross-line portion rectangle 130, and its width CRw is designated by the maximal edge size CRmax while its height CRh is designated by the minimal edge size CRmin. Thus, one way to eliminate inaccurately isolated cross-line portions is based upon the comparison of the width and or the height of the minimal rectangle against the expected range defined by the minimal edge size CRmin and the maximal edge size CRmax. In other words, according to the above described elimination criteria, the width CRw and the height CRh has to meet the requirement as expressed in the following equations.

$$CRmin <= CRw <= CRmax \quad (7)$$

$$CRmin <= CRh <= CRmax \quad (8)$$

Referring to FIG. 11, a flow chart illustrates the steps involved in further selecting the cross-line portions after masking an input image. After extracting an initial rectangle or an area for masking in an input image in a Step 601, the above described masking is performed against the area in a Step 602. For example, the initial rectangles are defined to contain continuous black or on pixels. After masking, cross-line portion rectangles are determined in a Step 603. In a Step 604, the size of each of the above determined cross-line portion rectangles is compared against threshold values such as the above described minimal and maximal edges Crmin and Crmax. Only when the above test is met in the Step 604, an additional test is performed in a Step 605 to further eliminate undesirably selected cross-line portions containing a cross-line area of characters such as a plus sign and others in a foreign language. When the width and the height of the initial rectangle Rw and Rh are both smaller than or equal to a predetermined threshold value Rsth as indicated in the Step 605 and the ratio of the width Rw to the height Rh (Rw/Rh) as well its reverse ration (Rh/Rw) are also both smaller than a ratio Rta of the edges of the initial square as indicated in a Step 606, the cross-line portion is deemed to contain a non-marker and eliminated from further processing. On the other hand, when a cross-line rectangle candidate survives the above scrutiny, it is considered to be a bona fide cross-line portion. The above steps are repeated for every rectangle candidate that includes the same cross-line as indicated in a Step 607. When every rectangle for the same cross-line is processed, a center of the rectangle is determined in a Step 608. Finally, a Step 609 extracts information of the cross-line portion candidate as a true cross-line, and the information such as the center coordinates and the width and the lines is stored for later use. The above process is repeated until every cross-line portion rectangle is processed as indicated in a Step 610.

Figure 12A:
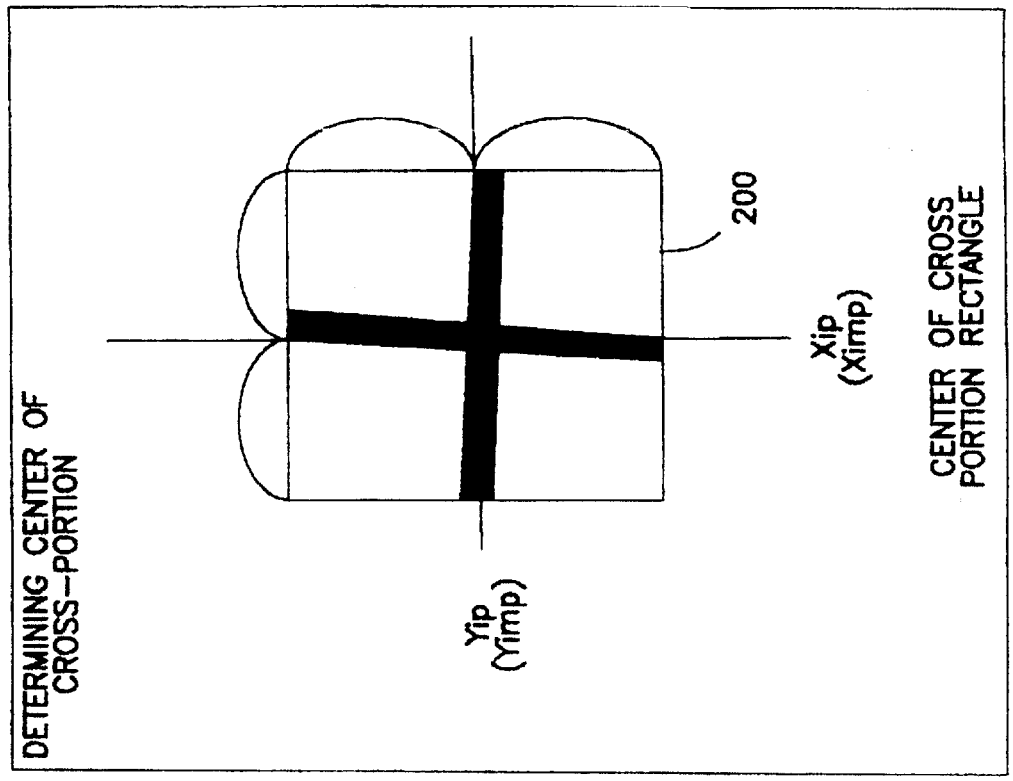
FIGS. 12A and 12B diagrammatically illustrate exemplary ways to determine the center of the isolated cross-line portion.
Figure 12B:
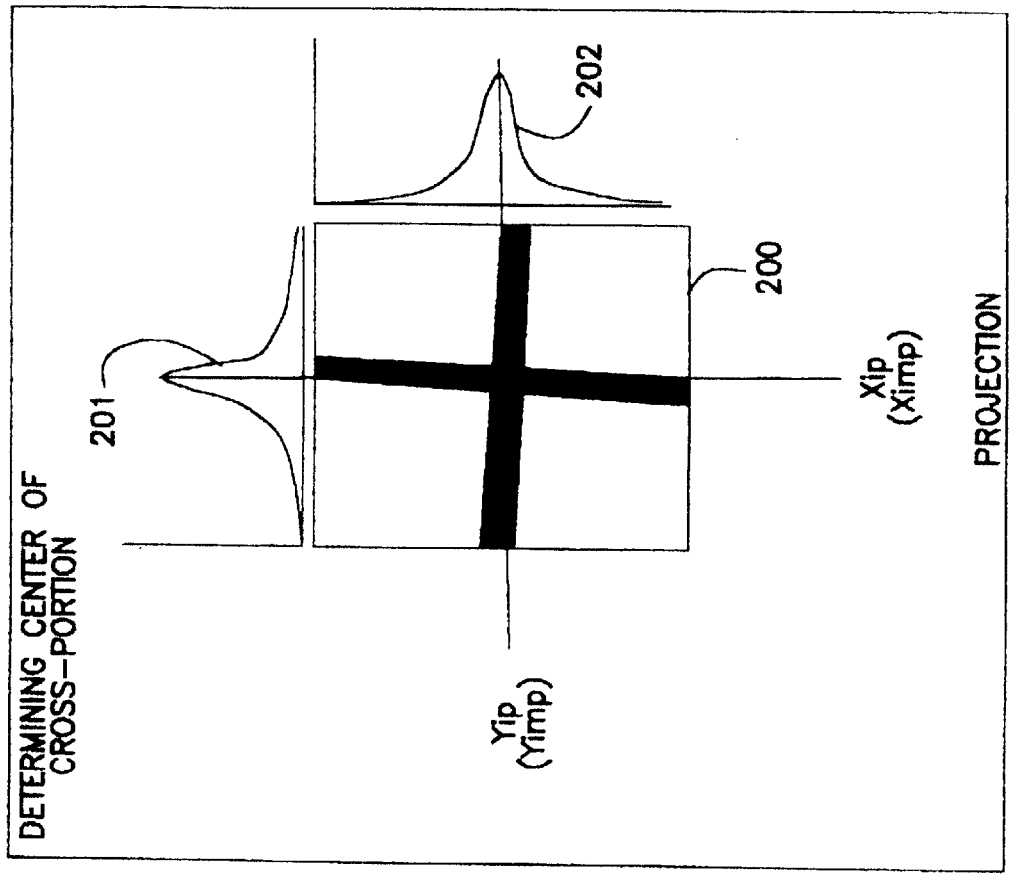

Referring to FIG. 12, to determine the center of a cross-line portion rectangle, one way includes the use of midpoints of the edges as shown in a part A. On the other hand, another way is to use a maximal point in projection data as indicate in a part B. After the coordinates of cross-line portions and other corresponding marks such as label characters in an input form image are determined, some of these cross-line portions are eliminated before and after transformation so as to accurately recognize alphanumeric data images in the input form image.

Figure 13A:
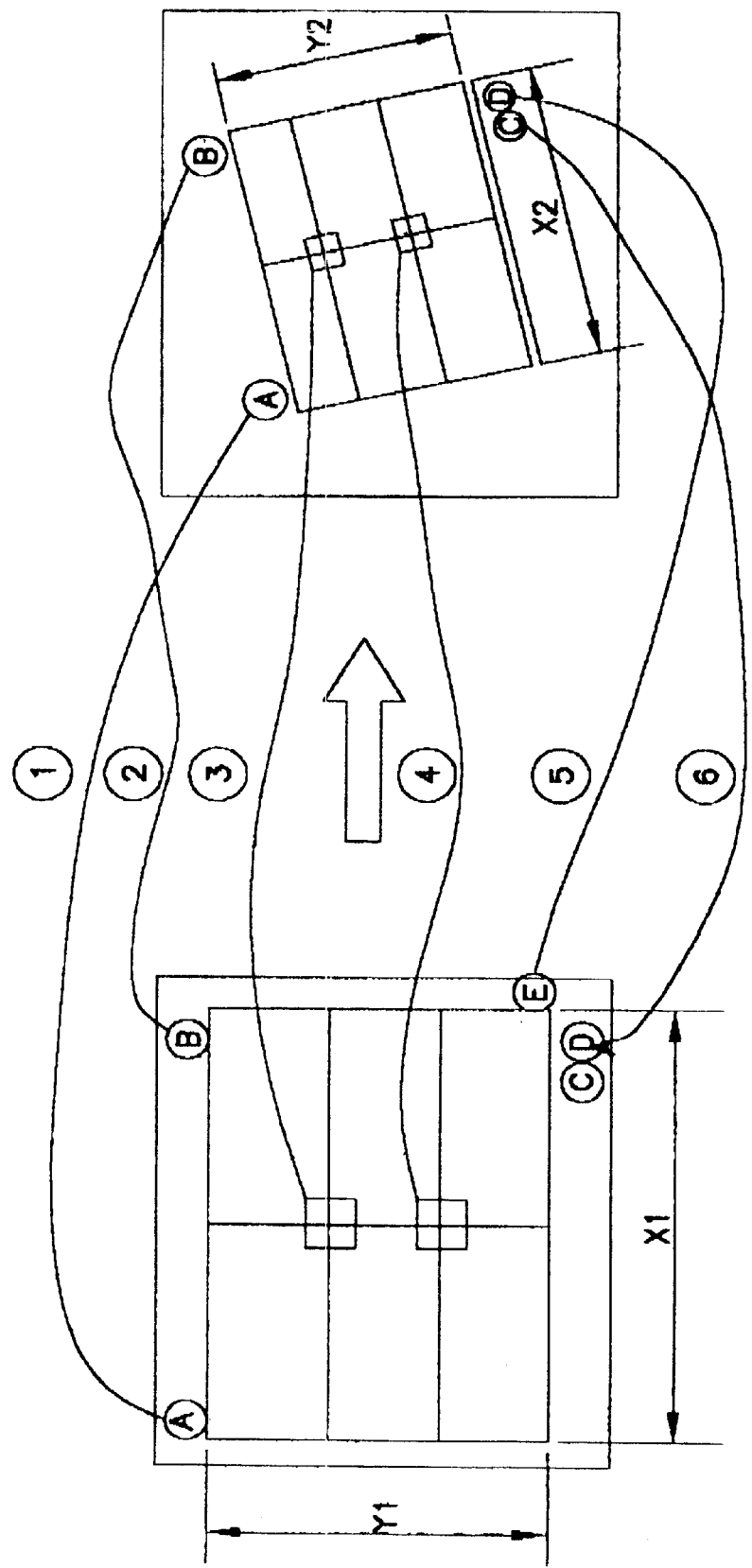
FIGS. 13A, 13B, 13C, 13D and 13E respectively illustrate a predetermined number of pairs of corresponding portions between an input form image and a standard form image; a first distribution histogram for indicating a distribution of scale factors along each of the X and Y axes; and a second distribution histogram for eliminating certain pair of the selected corresponding portions according to the current invention.
Figure 13B:
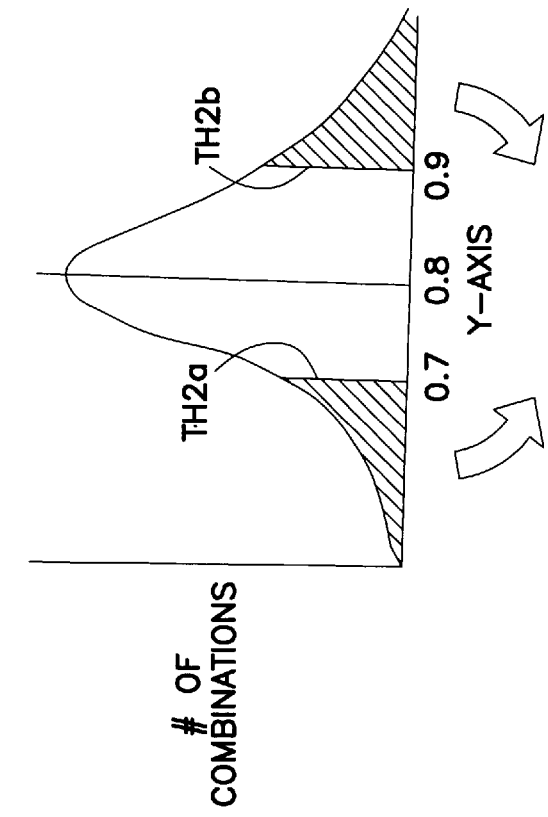
Figure 13C:
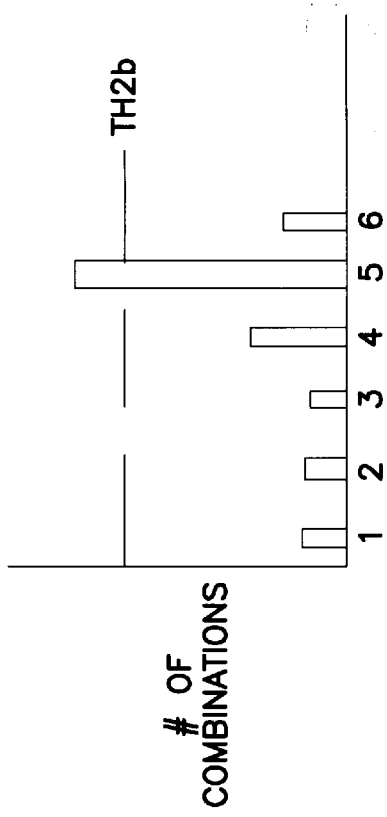
Figure 13D:
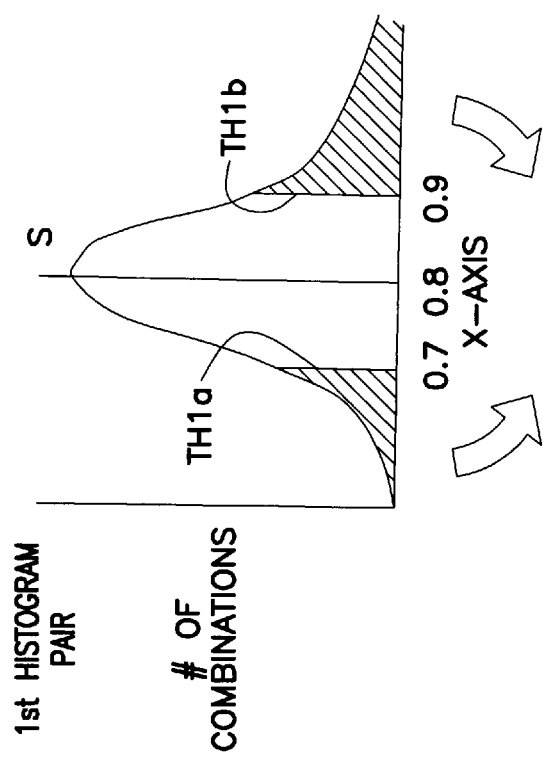
Figure 13E:
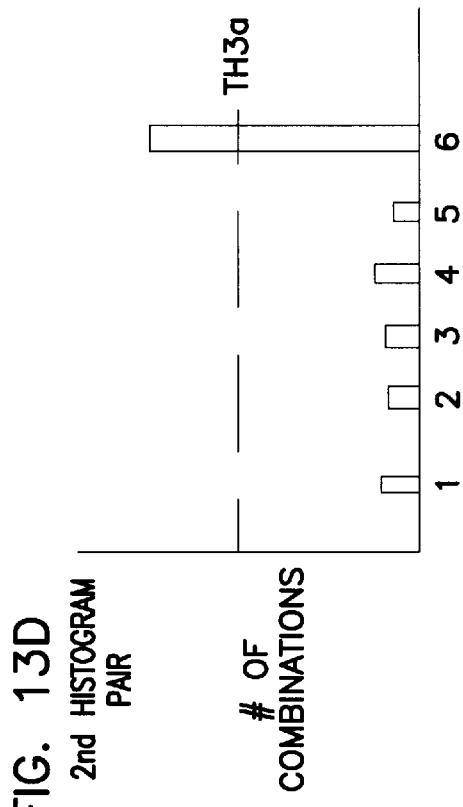

Now referring to FIGS. 13A, 13B and 13C, one preferred process of eliminating certain pairs of corresponding cross-line portions according to the current invention is illustrated in an example. The following operations may be performed by a first timing mark elimination unit 104 of the second preferred embodiment as shown in FIG. 5. FIG. 13A graphically illustrates a result of detected pairs 1 through 6 of corresponding marks including cross-line portions and label characters. The input form image has been reduced in size, rotated in a counter clockwise direction and positioned prior to the detection of the common marks.

Still using the above illustrated example, FIG. 13B shows first distribution histograms including a X-scaling factor distribution and a Y-scaling factor distribution. To construct the first distribution histograms, a predetermined number of pairs of the corresponding marks is used to determine a scale factor. For example, to determine a scale factor distribution along the X axis, each of $_6C_3$ combinations of three pairs of corresponding marks such as 1-2-3, 2-3-4, 3-4-5, . . . etc are used from an input form image as well as from a standard form image so that a ratio of corresponding combinations provides a scaling factor. In particular, for each combination consists of a reference pair or point and two other pairs which is also referred to as a first point and a second point. Similarly, to determine a scale factor distribution along the Y axis, $_6C_3$ combinations of three pairs of corresponding marks are also used to determine a scaling factor. One way to determine a scaling factor for each axis based upon a set of three points is expressed in the following equations:

$$Sy = \{(Li2 \cdot Lxc1) - (Lxc2 \cdot Li1)\} / \{(Lyc2 \cdot Lxc1) - (Lxc2 \cdot Lyc1)\} \quad (9)$$

$$Sx = \{Li1 - (Sy \cdot Lyc10)\} / Lxc1 \quad (10)$$

where Sx is a scaling factor for the X axis while Sy is a scaling factor for the Y axis. Lxc1 is a squared distance along the X axis between the reference point and a first point in a standard form image. Lxc2 is a squared distance along the X axis between the reference point and a second point in a standard form image. Similarly, Lyc1 is a squared distance along the Y axis between the reference point and the first point in a standard form image. Lyc2 is a squared distance along the Y axis between the reference point and the second point in a standard form image. Li1 is a squared distance between the reference point and the first point in an input form image while Li2 is a squared distance between the reference point and the second point in an input form image.

When the above determined scaling factors are plotted for each axis, the distribution histograms indicate certain aberrant scale factors above and below most common values in both the X and Y directions. The aberrant values are generally caused by the use of mismatched pairs of corresponding portions in the two images. In other words, if the input form image is uniformly enlarged or reduced in size, the scale factor distribution histograms generally do not show a bell carve distribution. To determine which pairs of corresponding portions are contributing to inaccurate scale factors, combinations yielding certain scale factors above and below a first pair of threshold values TH1*b* and TH1*a* are identified for the X-axis distribution. Similarly, combinations yielding certain scale factors above and below a second pair of threshold values TH2*b* and TH2*a* are also identified for the Y-axis distribution.

Now referring to FIG. 13C, the above identified combinations are plotted for the occurrence of each reference pair in a second distribution histograms. In other words, since each of the second distribution histograms is generated from combinations in skewed portions of the first distribution histograms, high occurrence generally indicates that a pair involving the reference point is likely to have been erroneously matched. Threshold values TH3a and TH2b are used to identify a pair involving the reference point that is to be eliminated from further processing. In the above example as illustrated in FIG. 13A, pairs 5 and 6 have been erroneously mismatched due to their proximity, and FIG. 13C indicates these mismatches. The threshold values for the first and second distribution histograms are generally determined in part based upon a distance between pairs. In general, a rule of thumb is that he closer a pair is, the higher a threshold value becomes.

Figure 14:
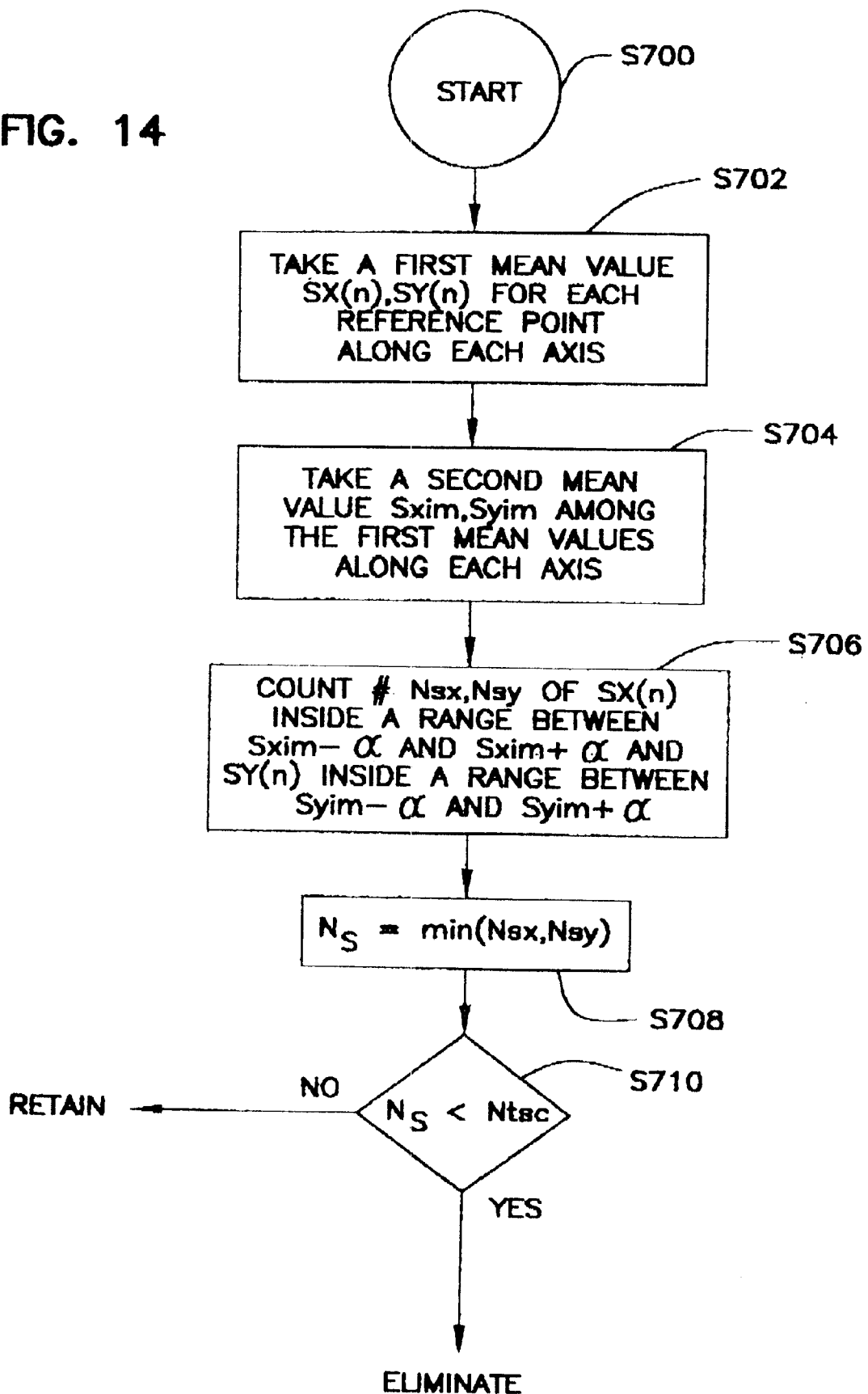
FIG. 14 is a flow chart for a second preferred process of eliminating certain pair of the selected corresponding portions according to the current invention.

Now referring to FIG. 14, a second preferred process of eliminating certain pairs of corresponding cross-line portions according to the current invention is illustrated in a flow chart. Although the following operations may be performed by a second timing mark elimination unit 106 of the second preferred embodiment as shown in FIG. 5, the second preferred process does not have to be performed subsequent to the above described first preferred process. However, when the second preferred process is performed after the first preferred process, the pairs left after the above described elimination process are referred to as remaining pairs. Using one of the remaining pairs of corresponding portions as a reference point, a first mean scaling value is determined for each reference point and is designated as SX(n) and SY(n) respectively along the X axis and the Y axis in a Step 702. In a Step 704, a second mean scaling value is subsequently determined among the first mean scaling values for each axis and is respectively designated as Sxim and Syim. A number of SX(n) within a range of the second mean scaling value Sxim±a predetermined value α is determined and is designated as Nsx for the X axis in a Step 706. Similarly, a number of Sy(n) within a range of the second mean scaling value Syim±a predetermined value α is determined and is designated as Nsy for the Y axis in the Step 706. The predetermined value α is adjustable based upon a distance between a reference point and other points in a combination for determining a scale factor. In a step 708, the smaller of the values Nsx and Nsy is selected as a minimal value Ns, and the selected value Ns is compared against a predetermined threshold value Ntsc. If Ns<Ntsc, then the reference point or the pair is eliminated from further processing. Some of the above described steps S706–710 are repeated for each reference point.

Figure 15:
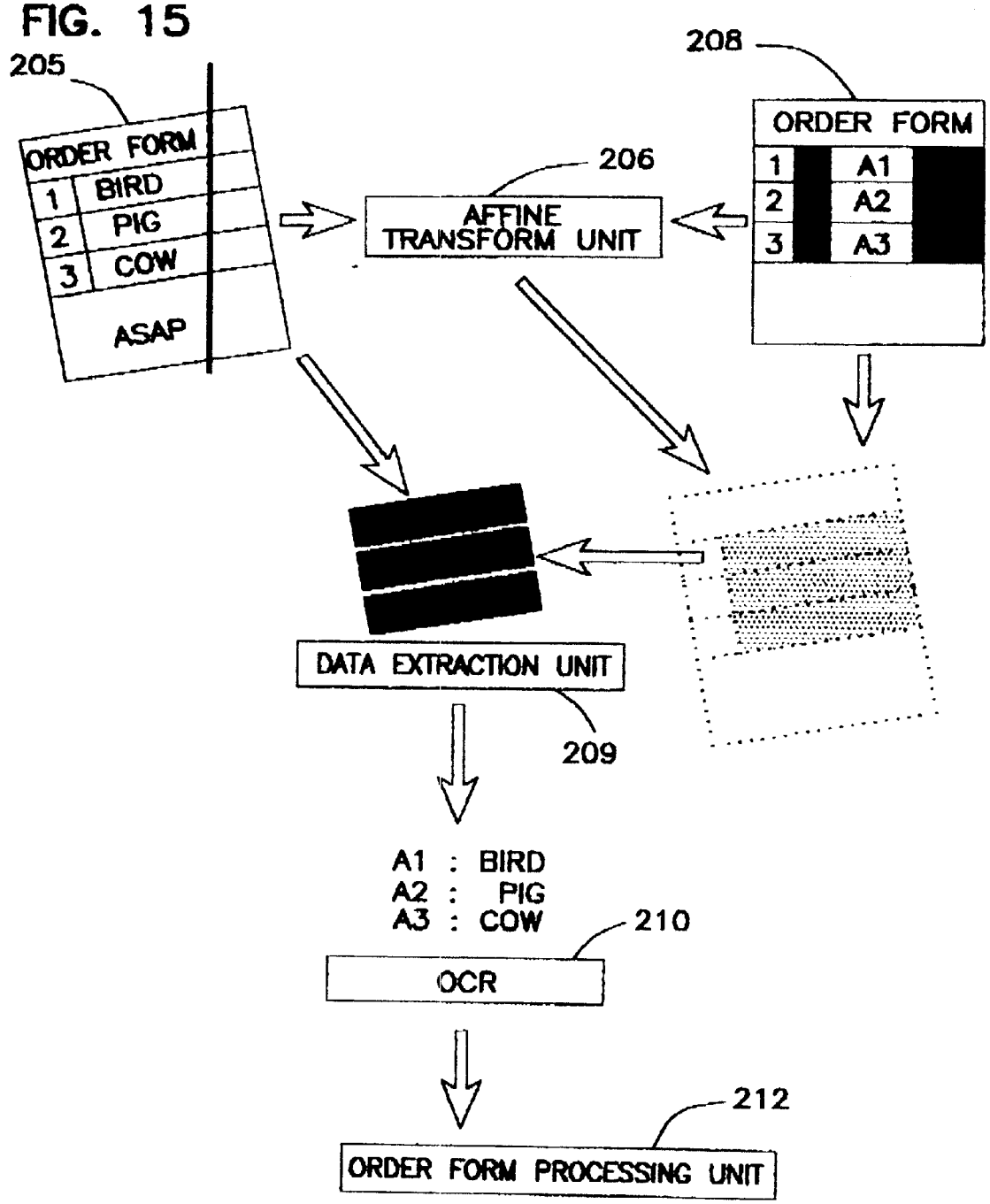
FIG. 15 diagrammatically illustrates how data image areas are extracted from an input form image based upon a standard form image.

Referring to FIG. 15, after the above described two elimination steps, according to a preferred embodiment of the current invention, an input form image or a standard form image undergoes transformation based upon the remaining pairs of the corresponding portions. One example of such a transformation is illustrated here. Upon receiving the remaining pair information and the graphical image of the data form 205, the position, the rotation and the scaling of a standard form image 208 is transformed to conform to the input form image 205. For example, the standard data form 208 includes coordinate information on areas such as A1, A2 and A3, where data is transmitted. In order to correctly extract the graphical image of the transmitted data from the input form image, according to one preferred process, the standard form image 208 undergoes an affine transformation via an affine transformation unit 206 to conform to the input form image 205 as disclosed in "Numerical Recipes in C" W. H. Press, Cambridge University Press, pp59–70, pp671–681. The affine transformation enables corrections in position, rotation and scaling at the same time.

$$\begin{pmatrix} Xi \\ Yi \end{pmatrix} = \begin{pmatrix} 0.999 & 0.0444 \\ -0.044 & 0.999 \end{pmatrix} \begin{pmatrix} Xt \\ Yt \end{pmatrix} + \begin{pmatrix} 10.023 \\ -3.281 \end{pmatrix}$$

where Xt and Yt are corrected coordinates while Xi and Yi are input coordinates. For example, in order to determine a pixel value of the corrected image at, the corresponding input image coordinates are determined as follows:

$$\begin{pmatrix} Xi \\ Yi \end{pmatrix} = \begin{pmatrix} 0.999 & 0.0444 \\ -0.044 & 0.999 \end{pmatrix} \begin{pmatrix} 2981 \\ 3864 \end{pmatrix} + \begin{pmatrix} 10.023 \\ -3.281 \end{pmatrix} = \begin{pmatrix} 3158.058 \\ 3725.691 \end{pmatrix} = \begin{pmatrix} 3158 \\ 3726 \end{pmatrix}$$

Thus, the pixel value at (3158, 3726) in the input image is used as a pixel value at coordinate (2981, 3864) in the corrected image.

Based upon the corrected standard data form, a data extraction unit 209 extracts data image from the input form 205. The extracted image for data such as "bird," "pig" and "cow" on the input form 205 is optically recognized by an optical character recognition unit 210. The data image is now in an efficient data storage form such as in an alphanumeric form, and an order form processing unit 212 further processes the converted data.

Optionally, subsequent to the transformation but prior to the data image extraction, a third elimination step is performed to further select pairs of corresponding portions to determine areas to be extracted for optical recognition.

Referring to FIG. 16, an exemplary set of data image information for a predetermined standard form is illustrated. The information includes at least a data image area number, a label associated with the data image area and sets of coordinates. The sets of the coordinates in this example represent a lower left corner and an upper right corner of a rectangle that defines a data image area. The above described information is generally stored in a data file or a memory unit so that a data extraction unit extracts the data image based upon the stored information.

Figure 17:
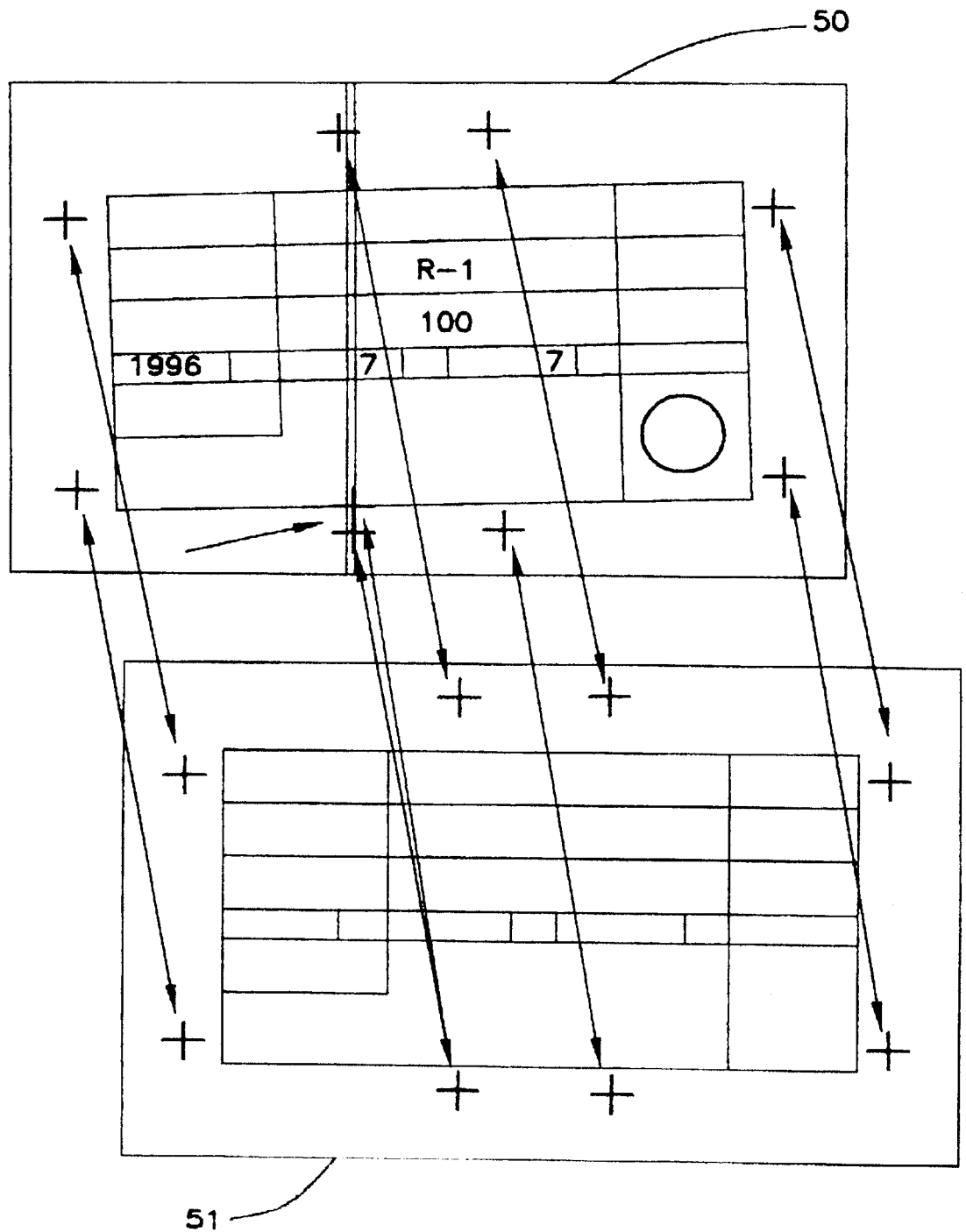
FIG. 17 illustrates a use of common marks in an input form image and a standard form image.

Lastly, referring to FIG. 17, an exemplary set of an input form image 50 and a standard form image 51 is illustrated. A predetermined number of cross marks are used as corresponding portions to establish the geometric relationships between the input form image 50 and the standard form image 51. Although these cross marks are only one example and other marks are also applicable, the common marks are preferred to be outside the form image so as to substantially avoid any erroneous detection of the marks.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of identifying a crossed portion of lines in an image input which are represented by pixels, comprising the steps of:

a) moving a mask consisting of at least five positionally fixed pixels against the image input, at least one of said five pixels located substantially at a center of other four of said five pixels, said one pixel being defined as a center pixel while said four pixels being defined as peripheral pixels;

b) modifying a pixel in the image input corresponding to said center pixel when any one pixel in the image input corresponding to said peripheral pixels has a pixel value other than a predetermined value; and c) repeating said steps a) and b) until the crossed portion of the lines is surrounded by off pixels, the crossed portion being defined as an area where two lines cross in a substantially perpendicular manner.

2. The method of identifying a crossed portion of lines according to claim 1 wherein said step b) turns off the pixel in the image input corresponding to said center pixel when any one pixel in the image input corresponding to said peripheral pixels is originally turned on.

3. The method of identifying a crossed portion of lines according to claim 1 wherein said mask includes four of said peripheral pixels located each located at a corner of a rectangle.

4. The method of identifying a crossed portion of lines according to claim 1 wherein said mask includes four of said peripheral pixels located each located at a corner of a square.

5. The method of identifying a crossed portion of lines according to claim 4 wherein said peripheral pixels are located with each other at a distance of a multiple of eight pixels.

6. The method of identifying a crossed portion of lines according to claim 1 further comprising an additional step d) of confirming the crossed portion based upon a predetermined height and a predetermined width.

7. The method of identifying a crossed portion of lines according to claim 6 further comprising an additional step e) of determining a center of the crossed portion.

8. A system for identifying a crossed portion of lines in an image input which are represented by pixels, comprising:

an input buffer for holding the image input;

a mask consisting of at least five positionally fixed pixels against the image input, at least one of said five pixels located substantially at a center of other four of said five pixels, said one pixel being defined as a center pixel while said four pixels being defined as peripheral pixels;

a cross line processor connected to said input buffer for modifying a pixel in the image input corresponding to said center pixel when any one pixel in the image input corresponding to said peripheral pixels has a pixel value other than a predetermined value until the crossed portion of the lines is surrounded by off pixels, the crossed portion being defined as an area where two lines cross in a substantially perpendicular manner.

9. The system for identifying a crossed portion of lines according to claim 8 wherein said cross line processor turns off the pixel in the image input corresponding to said center pixel when any one pixel in the image input corresponding to said peripheral pixels is originally turned on.

10. The system for identifying a crossed portion of lines according to claim 8 wherein said mask includes four of said peripheral pixels located each located at a corner of a rectangle.

11. The system for identifying a crossed portion of lines according to claim 8 wherein said mask includes four of said peripheral pixels located each located at a corner of a square.

12. The system for identifying a crossed portion of lines according to claim 11 wherein said peripheral pixels are located with each other at a distance of a multiple of eight pixels.

13. The system for identifying a crossed portion of lines according to claim 8 further comprising a cross line confirming unit for confirming the crossed portion based upon a predetermined height and a predetermined width.

14. The system for identifying a crossed portion of lines according to claim 13 wherein said cross line processor determines a center of the crossed portion.

15. A computer readable recording medium containing software for identifying corresponding positions in an image input which are represented by pixels, comprising the steps of:

q) moving a mask consisting of at least five positionally fixed pixels against the image input, at least one of said five pixels located substantially at a center of other four of said five pixels, said one pixel being defined as a center pixel while said four pixels being defined as peripheral pixels;

r) modifying a pixel in the image input corresponding to said center pixel when any one pixel in the image input corresponding to said peripheral pixels has a pixel value other than a predetermined value; and s) repeating said steps a) and b) until he crossed portion of the lines is surrounded by off pixels, the crossed portion being defined as an area where two lines cross in a substantially perpendicular manner.

* * * * *